(12) United States Patent
Chen et al.

(10) Patent No.: US 7,769,360 B2
(45) Date of Patent: Aug. 3, 2010

(54) ADAPTER FOR THE RF FRONT END PROCESSOR CHIP

(75) Inventors: Hsien-Ku Chen, Sanchong (TW); Shey-Shi Lu, Taipei (TW); Da-Chiang Chang, Xindian (TW); Ying-Zong Juang, Tainan (TW); Chin-Fong Chiu, Hsin-Chu (TW)

(73) Assignee: National Applied Research Laboratories, Taipei, Taiwan (CN)

( * ) Notice: Subject to any disclaimer, the term of this patent is extended or adjusted under 35 U.S.C. 154(b) by 848 days.

(21) Appl. No.: 11/703,182

(22) Filed: Feb. 7, 2007

(65) Prior Publication Data

US 2008/0188196 A1 Aug. 7, 2008

(51) Int. Cl.
*H04B 1/26* (2006.01)
(52) U.S. Cl. .................. 455/313; 455/234.1; 455/334
(58) Field of Classification Search ......... 455/313–334, 455/232.1, 234.1
See application file for complete search history.

(56) References Cited

U.S. PATENT DOCUMENTS

| 5,835,990 | A | * | 11/1998 | Saw et al. | 455/307 |
| 7,619,282 | B2 | * | 11/2009 | Yamazaki et al. | 257/347 |
| 2005/0186925 | A1 | * | 8/2005 | Rofougaran et al. | 455/333 |
| 2007/0026835 | A1 | * | 2/2007 | Yamaji et al. | 455/315 |

* cited by examiner

*Primary Examiner*—Lana N Le
(74) *Attorney, Agent, or Firm*—Birch, Stewart, Kolasch & Birch, LLP

(57) ABSTRACT

An adapter for RF front end processor chip wherein the RF front end processor chip includes a low noise amplifier which is used to receive a RF filter signal so as to generate a first signal. An adapter is used to receive a first signal so as to induce and generate a second signal and a third signal which is electrically reverse. Then a frequency mixer of the RF front end processor chip is used to receive the second signal and the third signal and a resonant signal, the second signal and the third signal are used to generate a medium frequency signal. Wherein, adapter includes a primary measured coil.

14 Claims, 5 Drawing Sheets

364

3644

3642

S3 →

S4 →

S5 →

A.C GND

ADAPTER FOR THE RF FRONT END PROCESSOR CHIP

FIELD OF THE INVENTION

The present invention relates to a RF front end processor chip, it specifically relates to an adapter for RF front end processor chip.

BACKGROUND OF THE INVENTION

In a wireless communication, the function of RF front end module is to receive RF signal and convert the RF signal into signal of medium frequency so as to be further processed by the circuit at the back end. Here the conversion of RF frequency signal into medium frequency signal is completed by the RF front end processor chip.

FIG. 1 is an illustration of the prior art RF front end module. The RF front end module 10 comprising of an antenna 12, a filter 14, an adapter 16, a RF front end processor chip 18 and a resonant signal generator 20. Antenna 12 is used to receive RF signal and RF signal of different frequencies are received through the design in the antenna structure. Filter 14 is used to receive RF signal in order to generate a RF filtered frequency. What needs to be noticed is, in order to reduce manufacturing cost and for the convenience concern, antenna 12 is thus designed toward the direction of multiple frequencies and filter 14 is used to filter out RF signals so as to generate RF filtered signals which are used in special frequency sections and to be further processed by circuits after RF front end module 10. Adapter 16 is used to receive RF filtered signal so as to convert it into double balance architecture S1 and S2 and RF front end processor chip 18, through the reception of signals S1 and S2 and a resonant signal generated by resonant signal generator 20, is used to generate medium frequency signal SIF to be further processed and used by the circuit after RF front end module 10. Wherein, adapter 16 is realized through transform form and resonant signal generator 20 can be realized through quartz oscillator.

RF front end processor chip 18 comprising of a low noise amplifier 182 and a frequency mixer 184 (Mixer), low noise amplifier 182 (LNA) is used to receive signals S1 and S2 so as to reduce the noises of S1 and S2 and to amplify signals S1 and S2. Frequency mixer 184 is used to receive the output signal of low noise amplifier 182 and the above-mentioned resonant signal so as to generate medium frequency $S_{IF}$. Generally speaking, since frequency mixer 184 adopts a design of double-balance structure and in order to cope with such structure, low noise amplifier 182 has to be realized in the form of differential amplifier circuit; therefore, the circuit structure is very complicated and the power loss is very large and moreover, the noise index is also very high.

Hence, a RF front end processor chip circuit structure that can reduce power loss and noise index is expected.

SUMMARY OF THE INVENTION

One purpose of the present invention is to provide an adapter for RF front end processor chip to reduce the power consumption of RF front end processor chip.

Another purpose of the present invention is to provide an adapter for RF front end processor chip to reduce the noise index of RF front end processor chip.

According to one embodiment proposed by the present invention, an adapter for RF front end processor chip wherein the RF front end processor chip comprising of a low noise amplifier which is used to receive RF filtered signal so as to generate a first signal. Through the reception of first signal by an adapter, electrically reverse second signal and third signal are generated through induction. Then a frequency mixer of a RF front end processor chip is used to receive second signal and third signal and a medium frequency signal is generated through resonant signal, second signal and third signal. Wherein adapter includes a primary measured coil, a secondary measured first coil and a secondary measured second coil; through the electrical connection of the positive end of the secondary measured first coil to the negative end of the secondary measured second coil or through the electrical connection of the negative end of the secondary measured first coil to the positive end of the secondary measured second coil, we can see that when the primary measured coil receives first signal, electrically reverse second signal and third signal will be induced at the location of secondary measured first coil and the secondary measured second coil.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which:

FIG. 3A~3B illustrate the structure of adapter of the present invention; and

DETAILED DESCRIPTION OF THE INVENTION

An adapter for RF front end processor chip is proposed in the present invention. The major difference between the present and the conventional RF front end processor chip is that an adapter structure is designed in the RF front end processor chip so that the low noise amplifier of a RF front end processor chip is connected to the front end of an adapter, that is, low noise amplifier can be produced in the form of non-differential amplifier circuit.

Figure 2:
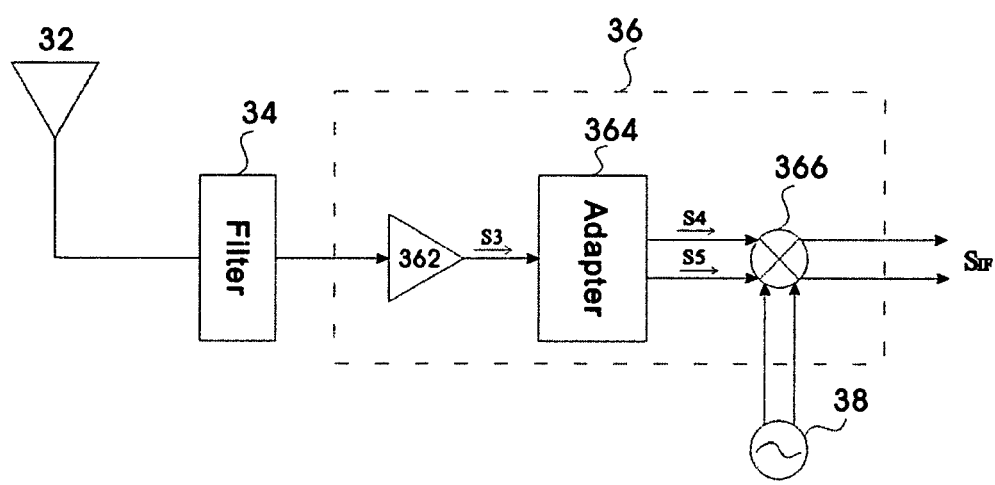
FIG. 2 illustrates RF front end processor chip of the present invention and its corresponding RF front end module.

FIG. 2 illustrates RF front end processor chip and its corresponding RF front end module of the present invention. RF front end module 30 in the present invention includes an antenna 32, a filter 34, a RF front end processor chip 36 and a resonant signal generator 38. Antenna 32 is used to receive a RF signal and the filter 34 is used to receive a RF signal in order to generate a RF filtered signal. In order to reduce manufacturing cost and for the convenience concern, the main trend in the design of the antenna 32 is of multiple frequency sections so as to support the use by many different wireless devices. Then through the filtering on the RF signal by the filter 34, RF filtered signal which can be used in specific frequency section can be generated and the generated signal is used in the back end circuit of RF front end module 30; for example: the antenna 32 is designed to be able to receive RF signal of frequency range of 4~6 GHz which further includes many frequency sections for wireless protocol or frequency section in use by countries around the world. When RF front end module 30 and its back end circuit need to process signals in the frequency range of 5 GHz, filter 34 is used to filter RF signal to keep only signal of frequency range of 5 GHz, that is, the RF filtered signal. After the reception of RF filtered signal by the RF front end processor chip 36, a medium frequency signal SIF is generated to be processed by the back end circuit of the RF front end module 30 through the resonant signal generated by the resonant signal generator 38.

The RF front end processor chip 36 includes a low noise amplifier 362, an adapter 364 and a frequency mixer 366. Low noise amplifier 362 is used to receive RF filtered signal so as to filter out the noise in the RF filtered signal and to amplify RF filtered signal to generate a signal S3. The Adapter 364 is used to receive the signal S3 in order to generate electrically reverse the signals S4 and S5. After the reception of the signal S4 and S5 by the frequency mixer 366, the resonant signal generated by the resonant signal generator 38 will be mixed with the signal S4 and S5 and will be processed to generate medium frequency signal SIF. Wherein, the adapter 364 is an adapter from non-equilibrium to equilibrium, that is, it is a device of single end input and double end output.

Figure 1:
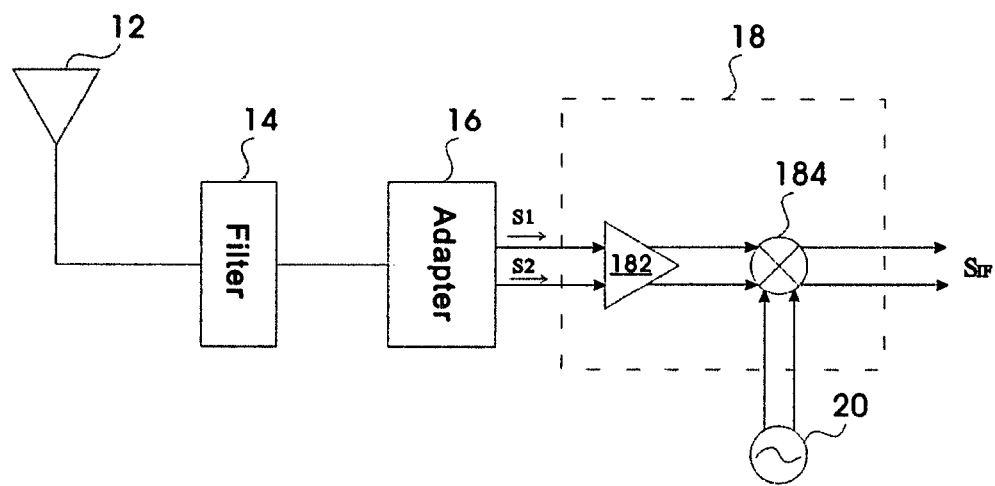
FIG. 1 illustrate the prior art RF front end module.

What needs to be noticed is, there is no difference in the design between the frequency mixer 366 and the conventional frequency mixer, that is, double-balanced structure is used in the design, and the adapter 364 is a device of single end input and double end output. In the present invention, through the installation of an adapter 364 in between the low noise amplifier 362 and the frequency mixer 366, the circuit of the low noise amplifier 362 can be designed as single end input and single end output. Please refer to FIG. 1, the structure of the RF front end processor chip 18; since double-balanced structure needs to be designed in the frequency mixer 184, the low noise amplifier 182 thus needs to be designed as a differential amplifier circuit structure of single end input and double end output. As compared to the prior art, the low noise amplifier 362 of the present invention can be of simpler circuit and the power consumption and noise index can be lower, and of course, cost is lower.

Furthermore, since the adapter 364 is a power-consumed component, if the power-consumed component appears at a later stage during the design of RF front end module, the entire noise index of RF front end module will be lower and the linearity will be better. Therefore, the adapter 364 for the present invention is installed in between the low noise amplifier 362 and the frequency mixer366, the noise index of the RF front end module 30 will be lower than that of the RF front end module 10 in FIG. 1, and besides, the linearity is better too. Additionally, since adapter is made within RF front end processor chip, it can thus be used for the purpose of impedance matching.

Figure 3A:
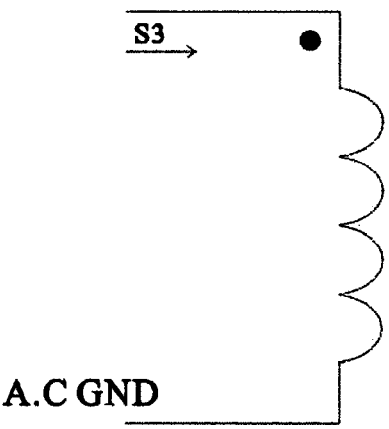
Figure 3A:
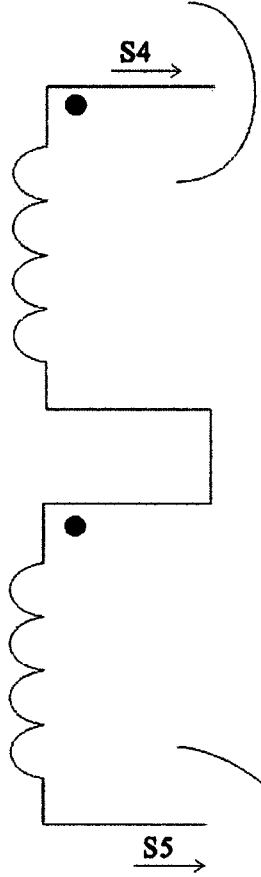
Figure 3B:
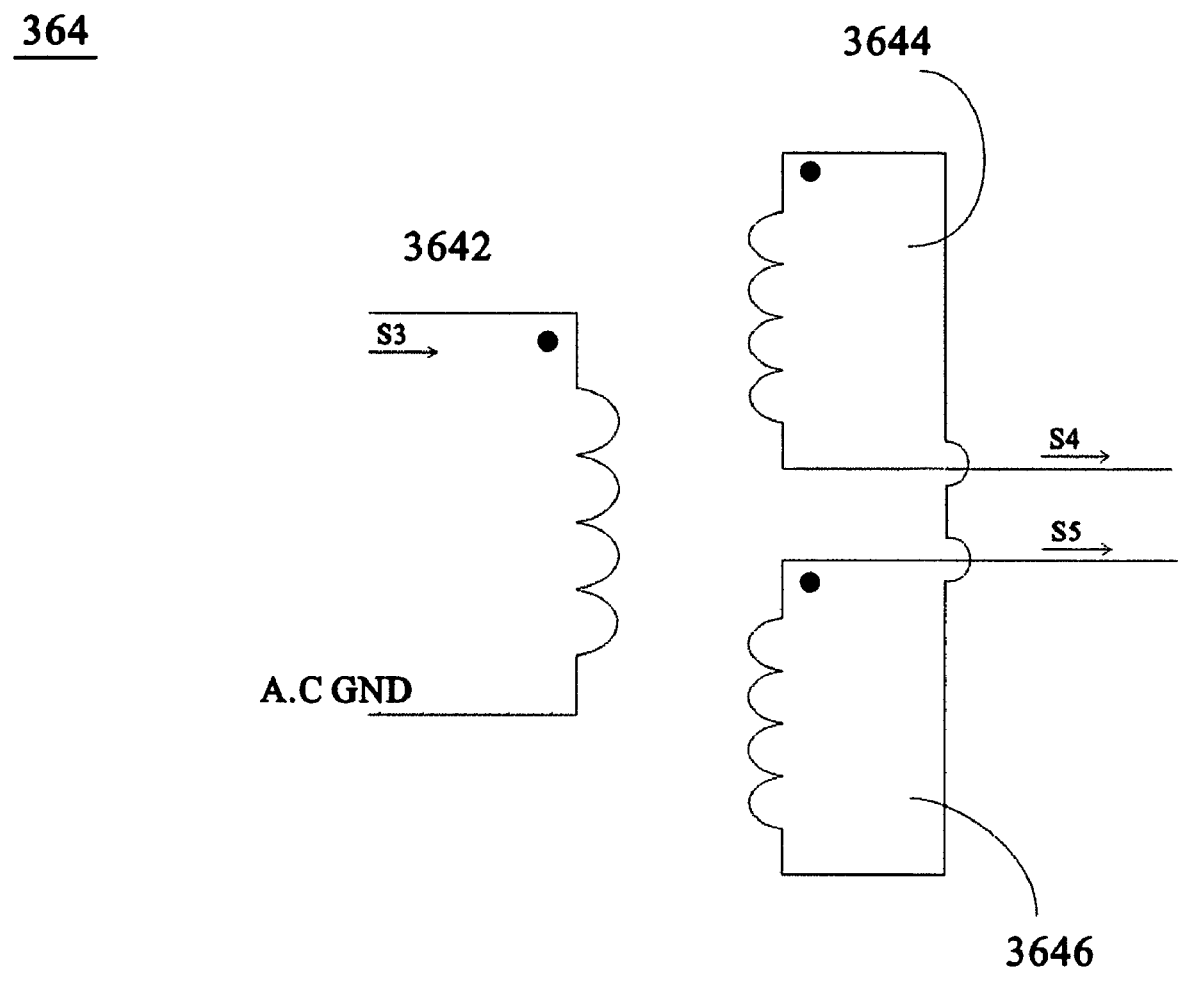

FIG. 3A and 3B illustrate the structure of adapter of the present invention. FIG. 3A, is an embodiment of the adapter 364 of FIG. 2, the adapter 364 further includes a primary measured coil 3642 and a secondary measured coil 3644 and 3646. Wherein, the primary measured coil 3642 and the secondary measured coils 3644 and 3646 possess respectively an electrically positive end and negative end. In FIG. 3A, each electrically positive end is represented by black point, that is, the polarity between the primary measured coil 3642 and the secondary measured coil 3644 and 3646 is the same; what needs to be noticed is, the negative end of the secondary measured coil 3644 is electrically connected to the positive end of the secondary measured coil 3646, speaking from the design, the negative end of the secondary measured coil 3644 and the positive end of the secondary measured coil 3646 can be grounded simultaneously. Through the grounding method, electrical connection is achieved between the negative end of the secondary measured coil 3644 and the positive end of the secondary measured coil 3646.

Please refer to FIG. 2 and FIG. 3A. After the reception of S3 signal by the primary measured signal 3642, through Lenz's law, signal of reverse electrical polarity to S3 will be generated by the secondary measured coil 3644 and 3646, that is, S4 generated by the positive end of the secondary measured coil 3644 and S5 generated by the negative end of the secondary measured coil 3646. What needs to be noticed is, the negative end of the secondary measured coil 3644 and the positive end of the secondary measured coil 3646 are used for the connection in the present invention; therefore, signal S4 and S5 are of electrically reverse polarities.

FIG. 3B is another embodiment of the adapter 364 in FIG. 2 and it is based on principle the same as that of FIG. 3A; what it is different than FIG. 3A is, electrical connection is made between the positive end of the secondary measured coil 3644 and the negative end of the secondary measured coil 3646, but through Lenz's law, the negative end of the secondary measured signal 3644 and the positive end of the secondary measured coil 3646 still generate signal of reverse polarity. Therefore, the polarities of the first measured coil 3642 and the secondary measured coils 3644 and 3646 of the adapter 364 can be selected to be the same or reverse; however, the connection method must be, the positive end of the secondary measured coil 3644 is electrically connected to the negative end of the secondary measured coil 3646 or the negative end of the secondary measured coil 3644 is electrically connected to the positive end of the secondary measured coil 3646 so that signals of reverse polarities are generated by the secondary measured coil 3644 and 3646.

Figure 4:
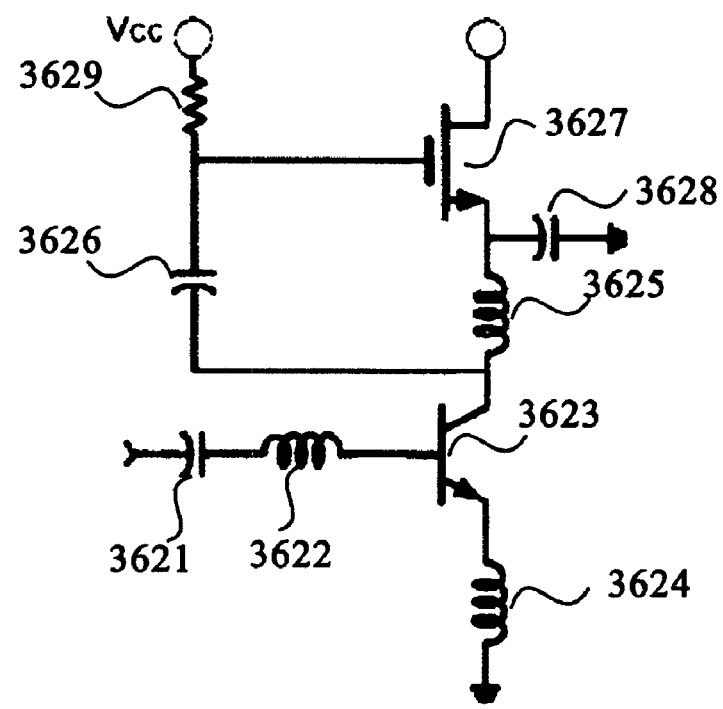
FIG. 4 illustrate the structure of low noise amplifier of the present invention.

FIG. 4 illustrates the structure of low noise amplifier of the present invention. Please refer to FIG. 2, in the present invention, the adapter is installed between low noise amplifier and frequency mixer and the low noise amplifier 362 can be designed as the circuit of FIG. 4.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A RF front end processor chip used to convert RF filtered signal into a medium frequency signal through a resonant signal, the RF front end processor chip comprising:
    a low noise amplifier to receive the RF filtered signal in order to generate a first signal;
    an adapter to receive the first signal and to induce and generate a second signal and a third signal, wherein the second signal and the third signal are of reverse electrical polarity; and
    a frequency mixer to receive the second signal and the third signal, wherein the second signal and the third signal are used to generate the medium frequency signal through the resonant signal,
    wherein the adapter further comprises:
        a primary measured coil comprising a first electrically positive end and a first electrically negative end, wherein the primary measured coil receives the first signal;
        a secondary measured first coil possessing a second electrically positive end and a second electrically negative end; and
        a secondary measured second coil possessing a third electrically positive end and a third electrically negative end and through the connection of the second electrically positive end to the third electrically negative end or through the electrical connection of the second electrically negative end and the third electrically positive end so that the secondary measured first coil and the secondary measured second coil will induce and generate respectively the second signal and the third signal.

2. The RF front end processor chip of claim 1, wherein the secondary measured first coil and the secondary measured second coil are of the same polarity as that of the primary coil.

3. The RF front end processor chip of claim 1, wherein the secondary measured first coil and the secondary measured second coil are of the reverse polarity as that of the primary measured coil.

4. The RF front end processor chip of claim 1, wherein the primary measured coil and the secondary measured first coil are of the same polarity and the primary measured coil and the secondary measured second coil are of the reverse polarity.

5. The RF front end processor chip of claim 1, wherein the primary measured coil and the secondary measured first coil are of the reverse polarity and the primary measured coil and the secondary measured second coil are of the same polarity.

6. The RF front end processor chip of claim 1, wherein the first electrically positive end receives the first signal and the first electrically negative end is grounded.

7. The RF front end processor chip of claim 1, wherein the first electrically positive end is grounded and the first electrically negative end receives the first signal.

8. An adapter for RF front end processor chip used to receive the first signal generated by a low noise amplifier of the RF front end processor chip, wherein the adapter further comprises:
a primary measured coil possessing a first electrically positive end and a first electrically negative end, wherein the primary measured coil is used to receive the first signal;
a secondary measured first coil possessing a second electrically positive end and a second electrically negative end; and
a secondary measured second coil possessing a third electrically positive end and a third electrically negative end, then through the electrical connection between the second electrically positive end and the third electrically negative end or through the electrical connection between the second electrically negative end and the third electrically positive end so that the secondary measured first coil and the secondary measured second coil will induce and generate respectively the second signal and the third signal, and then the second signal and the third signal are transferred to a frequency mixer of the RF front end processor chip.

9. The adapter of claim 8, wherein the secondary measured first coil and the secondary measured second coil and the first measured coil are of the same polarity.

10. The adapter of claim 8, wherein the secondary measured first coil and the secondary measured second coil and the primary measured coil are of the reverse polarity.

11. The adapter of claim 8, wherein the primary measured coil and the secondary measured first coil are of the same polarity and the primary measured coil and the secondary measured second coil are of reverse polarity.

12. The adapter of claim 8, wherein the primary measured coil and the secondary measured first coil are of reverse polarity and the primary measured coil and the secondary measured second coil are of the same polarity.

13. The adapter of claim 8, wherein the first electrically positive end receives the first signal and the first negative end is grounded.

14. The adapter of claim 8, wherein the first electrically positive end is grounded and the first electrically negative end receives the first signal.

* * * * *